US008792473B2

(12) United States Patent
Bekiares et al.

(10) Patent No.: US 8,792,473 B2
(45) Date of Patent: Jul. 29, 2014

(54) SYNCHRONIZATION OF A PLURALITY OF DATA STREAMS

(75) Inventors: Tyrone D. Bekiares, Chicago, IL (US); Gregory D. Bishop, St. Charles, IL (US); James A. Marocchi, Winfield, IL (US); Hemang F. Patel, Hoffman Estates, IL (US); Peter E. Thomas, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1149 days.

(21) Appl. No.: 12/337,731

(22) Filed: Dec. 18, 2008

(65) Prior Publication Data

US 2010/0157973 A1    Jun. 24, 2010

(51) Int. Cl.
*H04J 3/16* (2006.01)
*H04W 4/00* (2009.01)
*H04N 21/43* (2011.01)
*H04N 21/462* (2011.01)
*H04W 56/00* (2009.01)

(52) U.S. Cl.
CPC ....... *H04N 21/4622* (2013.01); *H04N 21/4302* (2013.01); *H04W 56/00* (2013.01)
USPC .......... 370/350; 370/503; 370/509; 370/512; 370/514; 370/338

(58) Field of Classification Search
USPC ................................. 370/350, 324, 503–510
See application file for complete search history.

(56) References Cited

U.S. PATENT DOCUMENTS

| 6,295,461 | B1 * | 9/2001 | Palmer et al. ................. 455/557 |
| 6,744,789 | B1 * | 6/2004 | Michener ...................... 370/509 |
| 7,668,208 | B2 * | 2/2010 | Moesle ........................ 370/509 |
| 7,684,565 | B2 * | 3/2010 | Medvinsky .................... 380/44 |
| 7,684,980 | B2 * | 3/2010 | Rousseau ..................... 704/229 |
| 7,688,208 | B2 * | 3/2010 | Schuler et al. ............. 340/572.1 |
| 7,747,021 | B2 * | 6/2010 | Lindteigen et al. ........... 380/274 |

(Continued)

FOREIGN PATENT DOCUMENTS

WO    03094550 A1    11/2003

OTHER PUBLICATIONS

PCT International Search Report Dated Jul. 14, 2010.

(Continued)

*Primary Examiner* — Candal Elpenord
(74) *Attorney, Agent, or Firm* — Steven A. May; Terri H. Smith

(57) ABSTRACT

A method of synchronizing a plurality of data streams. A land mobile radio (LMR) data stream can be generated by a LMR communication device. At least one LMR identifier can be communicated from the LMR communication device to a broadband communication device. A broadband data stream can be generated by the broadband communication device. The broadband data stream and the LMR identifier can be communicated from the broadband communication device via an access network. The LMR identifier can enable synchronization of the LMR data stream with the broadband data stream.

17 Claims, 3 Drawing Sheets

(56) References Cited

U.S. PATENT DOCUMENTS

| | | | |
|---|---|---|---|
| 7,864,747 B2* | 1/2011 | Wolfe et al. | 370/350 |
| 8,169,983 B2* | 5/2012 | Janky et al. | 370/338 |
| 8,315,201 B2* | 11/2012 | Cordeiro et al. | 370/324 |
| 2005/0154599 A1 | 7/2005 | Kopra et al. | |
| 2006/0133309 A1* | 6/2006 | Mathis et al. | 370/328 |
| 2006/0209878 A1 | 9/2006 | Nelson | |
| 2006/0239458 A1* | 10/2006 | Bicksler et al. | 380/221 |
| 2006/0262800 A1 | 11/2006 | Martinez et al. | |
| 2008/0273504 A1* | 11/2008 | Foley | 370/337 |
| 2010/0046924 A1* | 2/2010 | Ikeda et al. | 386/95 |

OTHER PUBLICATIONS

International Preliminary Report on Patentability for counterpart International Application No. PCT/US2009/068260 mailed on Jun. 30, 2011.

Chow, E., "Media Synchronization," IEEE JSAC vol. 14, No. 1, Jan. 1996, 25 pages, accessed at http://cs.uccs.edu/~cs525/synmm/synmm.htm.

Office Action in counterpart Australian Patent Application No. 2009335873 mailed on May 27, 2013.

Office Action in counterpart Canadian Patent Application No. 2750834 mailed on Aug. 26, 2013.

* cited by examiner

SYNCHRONIZATION OF A PLURALITY OF DATA STREAMS

FIELD OF THE INVENTION

The present invention generally relates to radio communications and, more particularly, to synchronization of multiple data streams.

BACKGROUND OF THE INVENTION

In recent years, the inability of emergency responders from different local, state and federal organizations to effectively communicate with one another has become a significant issue. The Project 25 (P25) steering committee was therefore established by various interested parties to select a common set of standards applicable to digital land mobile radio (LMR) services with the expectation that such standards will be universally adopted by public safety organizations within the United States, as well as some other countries.

LMR typically is used for voice communications and other low speed data services. When high speed data services are required, other types of communication systems may be required. For example, to wirelessly communicate video data, an emergency responder may opt to use a broadband communication link, for example a communication link established in accordance with IEEE 802.11, IEEE 802.16 (WiMAX), third generation (3G) wireless technology, fourth generation (4G) wireless technology, Long Term Evolution (LTE), or the like. In such circumstance, it still may be desirable to continue using LMR for voice data. Synchronization of the video and voice data can become an issue, however, since synchronization protocols such as Real-Time Transport Protocol (RTP) and Real-time Transport Control Protocol (RTCP) generally are not suitable for data communicated using LMR services.

BRIEF DESCRIPTION OF THE FIGURES

Embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the synchronization of different data streams when the data streams are communicated using different types of communication services, for instance when a first data stream is communicated using a LMR service and at least a second corresponding data stream is communicated using another communication service. For example, when a first P25 compliant data stream is communicated using a LMR device, and a second corresponding broadband data stream is communicated using a broadband device, one or more LMR identifiers corresponding to the first data stream can be inserted into the second data stream. As used herein, a LMR identifier is a reference to a particular data element or a time offset in a LMR data stream. When the first and second data streams are to be reduced or merged, the identifiers can be used to synchronize the second data stream with the first data stream.

Figure 1:
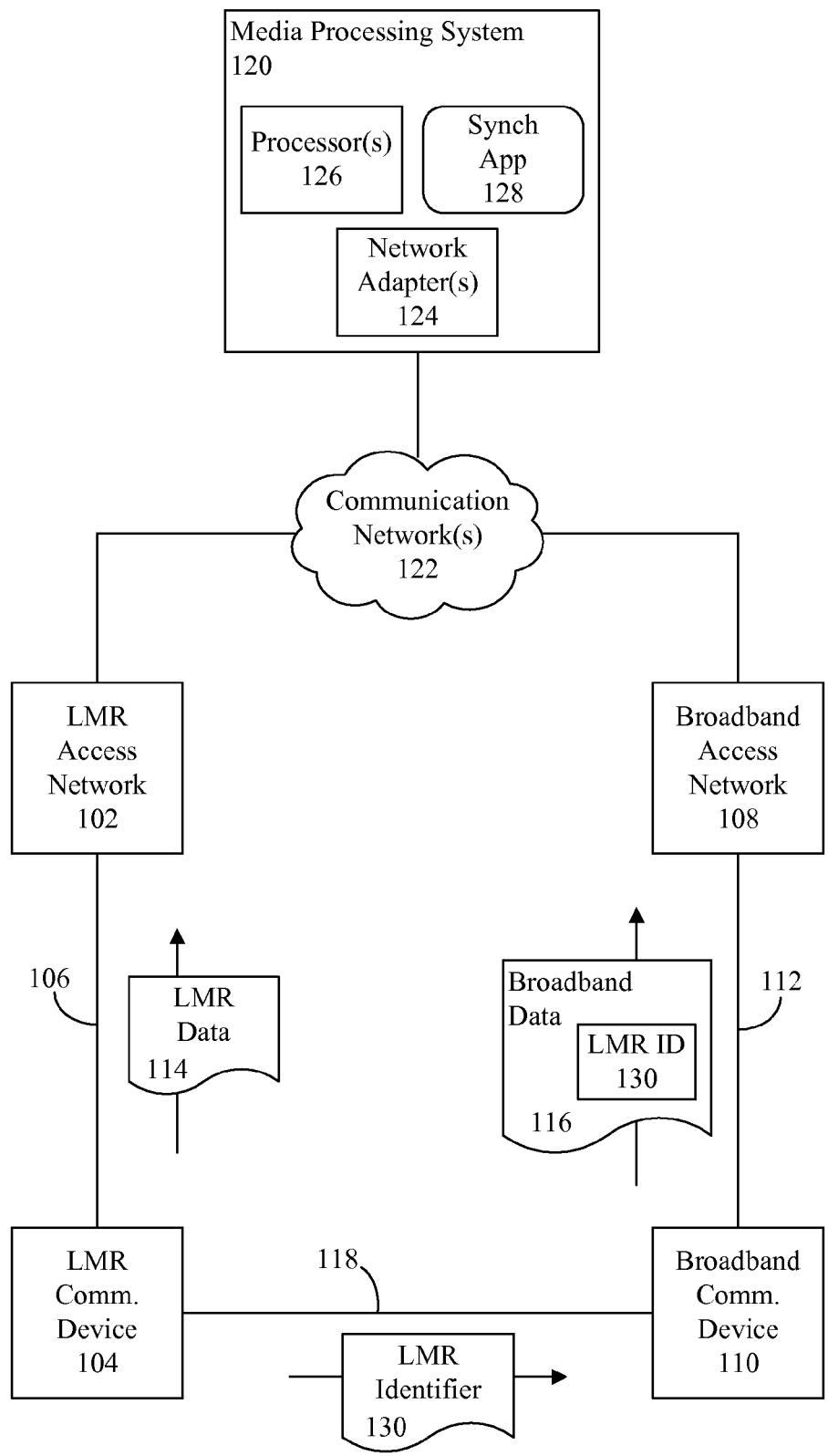
FIG. 1 depicts a communication system that is useful for understanding the present invention.

FIG. 1 depicts a communication system 100 that is useful for understanding the present invention. The communication system 100 can include a LMR access network 102, and at least one LMR communication device 104 that communicates with the LMR access network 102 via a wireless communication link 106. The LMR access network 102 can include one or more access points, base transceiver stations, repeaters, routers, mobile routers, network servers, and/or any other suitable network components, such as those known to the skilled artisan. In one arrangement, the LMR access network 102 can be implemented in compliance with applicable P25 standards for LMR services.

The LMR communication device 104 can be a radio, a mobile radio, a mobile router, a mobile telephone, a personal digital assistant, or any other wireless communication device that may be suitably configured to wirelessly communicate with the LMR access network 102. In that regard, the LMR communication device 104 also can be implemented in compliance with applicable P25 standards for LMR services.

The communication system 100 also can include a broadband access network 108, and at least one broadband communication device 110 that communicates with the broadband access network 108 via a wireless or wired communication link 112. The broadband access network 108 also can include one or more access points, base transceiver stations, repeaters, routers, mobile routers, network servers, and/or any other suitable network components.

The broadband access network 108 can be implemented in accordance with any suitable broadband communication standards, examples of which include, but are not limited to, the Transmission Control Protocol/Internet Protocol (TCP/IP), IEEE 802.11, IEEE 802.16 (WiMAX), 3G wireless technology, 4G wireless technology, LTE, and the like. The broadband communication device 110 can communicate with the broadband access network 108 in accordance with any such protocols implemented by the broadband access network 108. In that regard, the broadband communication device 110 can be a mobile telephone, a mobile radio, a personal digital assistant, a computer, a mobile computer, a mobile terminal, an application specific device, or any other device that can send and/or receive communication signals via wired and/or wireless communication links to the broadband access network 108.

Further, the LMR communication device 104 and the broadband communication device 110 can be configured to operate as collaborative devices. As used herein, "collaborative devices" are communication devices that generate respective data streams that are distinct from one another, yet correspond to one another. For example, the LMR communication device 104 can generate a LMR data stream 114 that includes audio content, and the broadband communication device 110 can generate a broadband data stream 116 that includes video content which corresponds to the audio content. Still, other types of data can be communicated by collaborative devices and the invention is not limited in this regard.

In order for the LMR communication device 104 and the broadband communication device 110 to collaboratively operate, the LMR communication device 104 can communicate with the broadband communication device 110 via a wireless and/or wired communication link 118. For example, the LMR communication device 104 can communicate with the broadband communication device 110 via a personal area network (PAN) adapter, for instance in accordance with Bluetooth®, IEEE 802.15 (e.g. Zigbee®), infrared signaling, or in accordance with any other suitable protocol. In another arrangement, the communication link 118 can be established via a wired communication adapter, such as a universal serial bus (USB) communication port, an IEEE-1394 (FireWire®) communication port, or any other suitable serial or parallel communication port.

The LMR access network 102 and the broadband access network 108 each can be communicatively linked to a media processing system 120, for instance via a communication network 122. The communication network 122 can be a wide area network (WAN), such as the Internet, a metropolitan area network (MAN), a local area network (LAN), or any other communication network suitable for communicating LMR and broadband communications from the respective LMR access network 102 and broadband access network 108 to the media processing system 120. Alternatively, the LMR access network 102 and the broadband access network 108 can be communicatively linked to the media processing system 120 in another suitable manner. For instance, the LMR access network 102 can be communicatively linked to the media processing system 120 via a MAN, and the broadband access network 108 can be communicatively linked to the media processing system 120 via a WAN.

The media processing system 120 can comprise one or more network adapters 124, one or more processors 126, a synchronization application 128, data storage devices (not shown) and any other suitable components, such as those known in the art. The network adapter(s) 124 can comprise wired network adapters and/or wireless network adapters configured to communicate via the communication network 122, or via any other communication links over which the media processing system 120 sends and/or receives data.

In operation, the LMR communication device 104 can generate the LMR data stream 114 and communicate the LMR data stream 114 to the media processing system 120 via the communication link 106, the LMR access network 102, the communication network 122, and/or any other suitable communication networks and communication links. In one example, the LMR data stream 114 can be formatted to comply with applicable P25 standards. Examples of such data include voice data and other data that may be suitably communicated over a P25 based LMR access network. Notwithstanding, other LMR standards, such as terrestrial trunked radio (TETRA) and digital mobile radio (DMR), use fields similar to those used in P25, and the present arrangements also can be implemented using other such non-P25 LMR common air interfaces (CAIs).

When generating the LMR data stream 114, the LMR communication device 104 can generate one or more LMR identifiers 130 and communicate the LMR identifiers 130 to the broadband communication device via the communication link 118. In one arrangement, the LMR identifiers 130 can comprise, for example, one or more elements of the LMR data stream 114, such as time-varying P25 CAI data stream elements. The LMR identifiers 130 can be used to later identify a time offset in the received LMR data stream 114. Other types of LMR identifiers 130 also can be used and the invention is not limited in this regard.

In one aspect of the inventive arrangements, each LMR identifier 130 can identify a P25 encryption synchronization field, which can be an element of a P25 CAI data stream that identifies a particular P25 voice superframe which spans a particular period of the LMR data stream 114. In addition, an identifier that identifies a P25 voice frame index can be generated by the LMR communication device 104 by sampling a counter which is reset at the beginning of each P25 voice superframe, and is incremented by one for each P25 voice frame generated thereafter. The P25 voice frame index can identify a particular sub-period within the period spanned by the P25 voice superframe. For instance, the identifier that identifies the encryption synchronization field can identify a 360 ms P25 voice superframe, and the identifier that identifies the P25 voice frame index can identify a 20 ms period within a P25 voice superframe. In some systems, the use of the identifier for the encryption synchronization field may require that the LMR data stream 114 be encrypted.

In another arrangement, each LMR identifier 130 can identify a P25 voice frame index, which can be generated by the LMR communication device 104 by sampling a counter which is reset at the beginning of each P25 voice superframe, and is incremented by one for each P25 voice frame generated thereafter. The P25 voice frame index can identify a particular sub-period within the period spanned by the P25 voice superframe. Since a P25 voice superframe is not identified by the LMR identifier 130 in this arrangement, a device that processes the LMR identifier 130 (e.g. the media processing system 120) may assume that the LMR identifier 130 that identifies the P25 voice frame index inserted into the broadband data stream 116 corresponds to a P25 voice frame within the current P25 voice superframe being processed from the LMR data stream 114 received from the LMR communication device 104.

In a further arrangement, each LMR identifier 130 can identify a P25 voice frame, which can be an element of a P25 CAI data stream that identifies a particular P25 voice frame which spans a particular period of the LMR data stream 114. Some P25 voice frames may not be unique, however, for instance during periods of silence. When P25 voice frames containing voice signals are again detected, such P25 voice frames can be assigned a greater weight during synchronization processing.

In other arrangements, the LMR identifiers 130 can include other types of identifiers that correspond to the LMR data stream 114. For example, the LMR identifiers 130 can include time instance identifiers that identify instances in time within the LMR data stream 114, time offset identifiers that identify time offsets within the LMR data stream 114, bit offset identifiers that identify bit offsets within the LMR data stream 114, byte offset identifiers that identify byte offsets within the LMR data stream 114, voice frame count identifiers that identify voice frame counts within the LMR data stream 114, etc.

The LMR communication device 104 can push the LMR identifiers 130 to the broadband communication device 110 via the communication link 118 as a function of the LMR communication device generating the LMR data stream 114. In this regard, a LMR communication device 104 may push selected LMR identifiers 130 once or periodically for the duration of the LMR data stream from the LMR communication device 104 to the broadband communication device 110 via the communication link 118. In another arrangement, the broadband communication device 110 may once or periodically poll the LMR communication device 104 via the communication link 118 to obtain the appropriate LMR identifiers 130.

Upon reception of the LMR identifier 130 from the LMR communication device 104 via communication link 118, the broadband communication device 110 can associate each LMR identifier 130 with an appropriate broadband data element intended for transmission via the broadband data stream 116. It may be assumed that generation of the broadband data stream 116 by the broadband communication device 110 is synchronized with the generation of the LMR data stream 114 by the LMR communication device 104. Transmission and subsequent reception of the broadband data stream 116 and the LMR data stream 114, however, may or may not be synchronized.

Thus, if the communication link 118 has relatively low latency and the LMR identifiers 130 are generated as the LMR communication device 104 generates the LMR data stream 114, it can be inferred that the LMR identifiers 130 correspond to the broadband data elements of the broadband data stream 116 presently being generated by the broadband communication device 110. For example, the LMR identifier 130 can be received by the broadband communication device 110 from the LMR communication device 104 and, in real time, associated with the broadband data element presently being generated by the broadband communication device 110. In this regard, the term "real time" means a level of processing responsiveness that is sufficiently immediate. For instance, if the broadband data elements are video data elements, a LMR identifier 130 received from the LMR communication device 104 may be associated with the video data element of the broadband data stream presently being generated by the broadband communication device 110.

If, however, there is a latency associated with generation of the LMR identifier 130 and/or the communication link 118, such latency may be known or measured and processed to associate each LMR identifier 130 with the appropriate broadband data element of the broadband data stream 116. Such latency may be known or determined by the LMR communication device 104, the broadband communication device 110, or through cooperative signaling exchanged between the LMR communication device 104 and the broadband communication device 110.

Once the broadband communication device 110 has made a logical association between a received LMR identifier 130 and a broadband data element, the broadband communication device 110 can denote such an association by inserting the LMR identifier 130 at an appropriate offset into the broadband data stream 116. In one arrangement, the LMR identifier 130 can be inserted into the broadband data stream 116 as a real-time transport protocol (RTP) header extension attached to the associated broadband data element. Nonetheless, the invention is not limited in this regard. For instance, the LMR identifiers 130 can be associated with broadband data elements and inserted into the broadband data stream 116 using any means of data insertion or multiplexing known in the art.

The broadband communication device 110 can communicate the broadband data stream 116, inclusive of one or more corresponding LMR identifiers 130, to the media processing system 120 via the communication link 112, the broadband access network 108, the communication network 122, and/or any other suitable communication network(s).

As part of the media processing system 120, the network adapter(s) 124 can receive the LMR data stream 114 and the broadband data stream 116, and the processor(s) 126 can execute the synchronization application 128 to synchronize the LMR data stream 114 with the broadband data stream 116. For instance, the synchronization application 128 can process a LMR identifier 130 present in broadband data stream 116, search for this LMR identifier in the LMR data stream 114, and associate the referenced LMR data elements of the LMR data stream 114 with the respective broadband data elements of the broadband data stream 116. For instance, assume that the broadband data elements of the broadband data stream 116 are video frames with inserted LMR identifiers 130 which identify P25 encryption synchronization fields and P25 voice frame indexes. Upon processing an embedded LMR identifier 130 in the broadband data stream 116, the synchronization application 128 can search the LMR data stream 114 for the identified P25 encryption synchronization field and identify the P25 voice superframe referenced by the P25 encryption synchronization field. The synchronization application 128 also can associate the P25 voice frame, which is specified by the P25 voice frame index within the identified P25 voice superframe, with the associated video frame from the broadband data stream.

Once the association between a LMR data element from the LMR data stream 114 and a broadband data element from the broadband data stream 116 is made, the synchronization application 128 may determine the relative time offset between the two data streams. The data stream which is determined to be leading may be delayed by the synchronization application 128 to align with the data stream which is determined to be lagging. In one arrangement, the associated data elements from the LMR data stream 114 and the broadband data stream 116 may be reproduced in a synchronized fashion by the synchronization application 128. For example, if the broadband data elements in the broadband data stream 116 are video frames and the LMR data elements in the LMR data stream 114 are voice frames, and if the broadband data stream is lagging the LMR data stream, the associated voice frames from the LMR data stream may be delayed to enable reproduction in a synchronized fashion with the associated video frames from the broadband data stream. In another arrangement, the LMR data stream 114 and the broadband data stream 116 can be merged into a single data stream for subsequent synchronized reproduction. In another arrangement, the LMR data stream 114 and the broadband data stream 116 can be maintained as separate data streams with additional timing information inserted into one or both of the data streams for further synchronization purposes Notably, not every broadband data element may be associated with an inserted LMR identifier 130. In one arrangement, only a single instance of a LMR identifier 130 inserted into the broadband data stream 116 is required to synchronize the LMR data stream 114 with the broadband data stream 116. In another arrangement, periodic LMR identifiers 130 may be inserted into the broadband data stream 116 to ensure continual resynchronization. In a further arrangement, one or more LMR identifiers 130 can be associated with every broadband data element in the broadband data stream 116. Similarly, the synchronization application may or may not resynchronize the LMR data stream 114 and broadband data stream 116 upon every detection of an inserted LMR identifier 130 in the broadband data stream 116.

Figure 2:
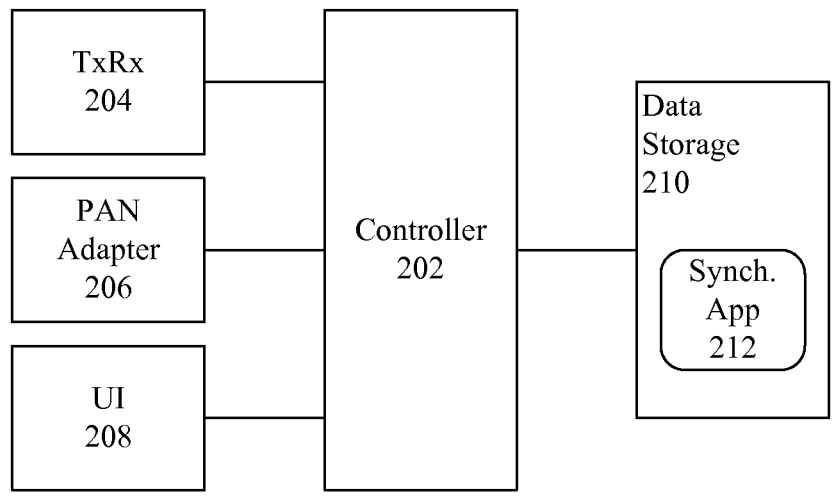
FIG. 2 depicts a LMR device that is useful for understanding the present invention.

FIG. 2 depicts a LMR communication device 104 that is useful for understanding the present invention. The LMR communication device 104 can include a controller 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The LMR communication device 104 also can include a transceiver 204 communicatively linked to the controller 202 via which the LMR communication device 104 communicates with the LMR access network. For example, the transceiver 204 can communicate in accordance with applicable P25 standards for LMR services. The transceiver 204 also can communicate in accordance with other digital LMR standards, for instance TETRA and digital mobile radio.

A PAN adapter 206 also can be communicatively linked to the controller 202. The PAN adapter 206 can include a wireless transceiver and/or a wired communication port that facilitates communication with other devices, such as the broadband communication device 110. For example, the PAN adapter 206 can include a PAN transceiver that communicates in accordance with Bluetooth®, IEEE 802, infrared signaling, or in accordance with any other suitable wireless communication protocol. The PAN adapter 206 also can comprise a USB communication port, an IEEE-1394 communication port, or any other suitable serial or parallel communication port.

The LMR communication device 104 also can include a user interface 208 communicatively linked to the controller 202. The user interface 208 can include one or more input audio transducers, output audio transducers, keys, keypads, soft keys, buttons, displays, touch screens, image capture devices, user input ports, and/or any other components that may receive user inputs and/or present information to one or more users. User interfaces are well known to the skilled artisan.

The LMR communication device 104 further can include a data storage 210 communicatively linked to the controller 202. The data storage 210 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 210 can be integrated into the controller 202, though this need not be the case.

A synchronization application 212 can be stored on the data storage 210 or otherwise made accessible to the controller 202. The synchronization application 212 can be executed by the controller 202 to implement the methods and processes described herein that are performed by the LMR communication device 104. For example, the controller 202 can execute the synchronization application 212 to communicate, via the PAN adapter 206, LMR identifiers to the broadband communication device 110, for instance as previously described. The controller 202 also can communicate the LMR data stream to the media processing system via the transceiver 304.

Figure 3:
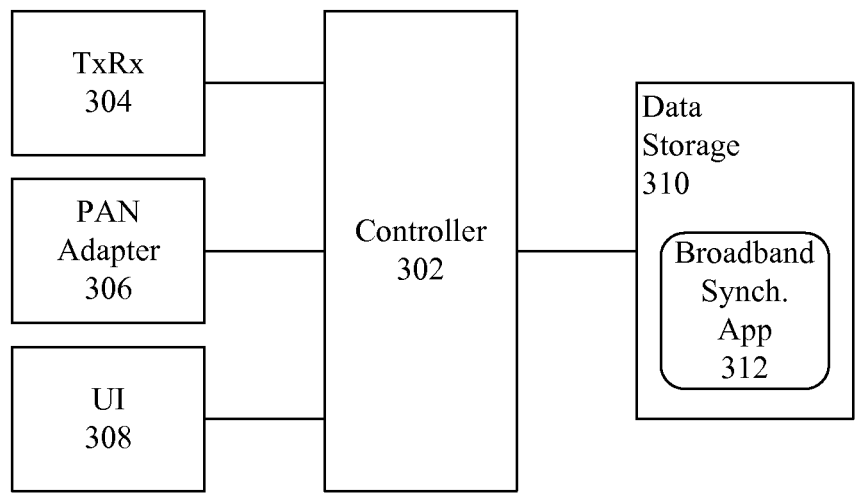
FIG. 3 depicts a broadband communication device that is useful for understanding the present invention.

FIG. 3 depicts a broadband communication device 110 that is useful for understanding the present invention. The broadband communication device 110 can include a controller 302, which may comprise, for example, one or more CPUs, one or more DSPs, one or more ASICs, one or more PLDs, a plurality of discrete components that can cooperate to process data, and/or any other suitable processing device. In an arrangement in which a plurality of such components are provided, the components can be coupled together to perform various processing functions as described herein.

The broadband communication device 110 also can include a transceiver 304 communicatively linked to the controller 302 via which the broadband communication device 110 communicates with the broadband access network. For example, the transceiver 304 can communicate in accordance with TCP/IP, IEEE 802.11, WiMAX, 3G and/or 4G wireless technology, LTE, and the like, for example as previously described.

A PAN adapter 306 also can be communicatively linked to the controller 302. The PAN adapter 306 can include a wireless transceiver and/or a wired communication port that facilitates communication with other devices, such as the broadband communication device 110. As with the PAN adapter of the LMR device, the PAN adapter 306 can include a PAN transceiver that communicates in accordance with Bluetooth®, IEEE 802, infrared signaling, or in accordance with any other suitable wireless communication protocol. The PAN adapter 306 also can comprise a USB communication port, an IEEE-1394 communication port, or any other suitable serial or parallel communication port.

The broadband communication device 110 also can include a user interface 308 communicatively linked to the controller 302. The user interface 308 also can include one or more input audio transducers, output audio transducers, keys, keypads, soft keys, buttons, displays, touch screens, image capture devices, user input ports, and/or any other components that may receive user inputs and/or present information to one or more users. User interfaces are well known to the skilled artisan.

The broadband communication device 110 also can include a data storage 310 communicatively linked to the controller 302. The data storage 310 can include one or more storage devices, each of which may include, but is not limited to, a magnetic storage medium, an electronic storage medium, an optical storage medium, a magneto-optical storage medium, and/or any other storage medium suitable for storing digital information. Again, the data storage 310 can be integrated into the controller 302, though this need not be the case.

A broadband synchronization application 312 can be stored on the data storage 310 or otherwise made accessible to the controller 302. The broadband synchronization application 312 can be executed by the controller 302 to implement the methods and processes described herein that are performed by the broadband communication device 110. For example, the controller 302 can execute the broadband synchronization application 312 to receive, via the PAN adapter 306, at least one LMR identifier generated by the LMR device, and insert the LMR identifier into a broadband data stream communicated by the broadband communication device to the media processing system via an access network. For instance, the broadband data stream and the LMR identifier can be communicated via the transceiver 304.

As noted, the LMR identifier can comprise at least one identifier of an element of a LMR data stream, for example an identifier that identifies a P25 encryption synchronization field, a P25 voice frame, a P25 voice frame index, a P25 voice superframe, or identifies any other suitable elements of the LMR data stream. In another arrangement, the LMR identifier can include a time instance identifier, a time offset identifier, a bit offset identifier, a byte offset identifier, a voice frame count identifier, or any other identifier that identifies a suitable offset within the LMR data stream.

Figure 4:
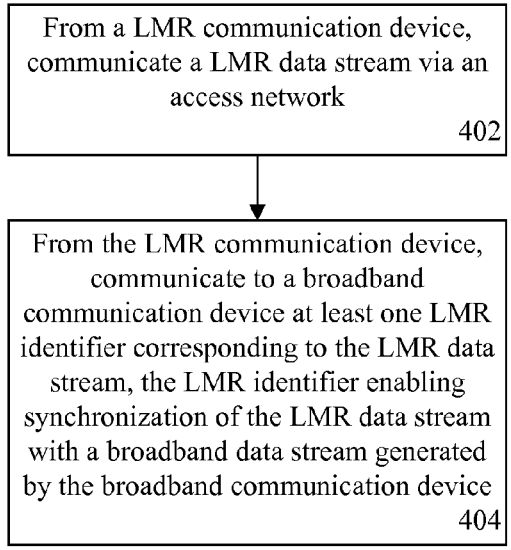
FIG. 4 is a flowchart depicting a data stream synchronization method that is useful for understanding the present invention.

FIG. 4 is a flowchart depicting a data stream synchronization method 400 that is useful for understanding the present invention. The method 400 can begin in a state in which a LMR communication device and a broadband communication device have each established communication links via respective access networks, and a communication link between the LMR communication device and the broadband communication device has been established, for example via a PAN or other communication port.

At step 402, from the LMR device, a LMR data stream can be communicated via its respective access network, for instance a LMR access network. At step 404, from the LMR communication device, at least one LMR identifier corresponding to the LMR data stream can be communicated to the broadband communication device. The LMR identifier can enable synchronization of the LMR data stream with a broadband data stream generated by the broadband communication device. As noted, the LMR identifier can comprise at least one identifier of an element of a LMR data stream or an identifier that identifies a suitable offset within the LMR data stream.

Figure 5:
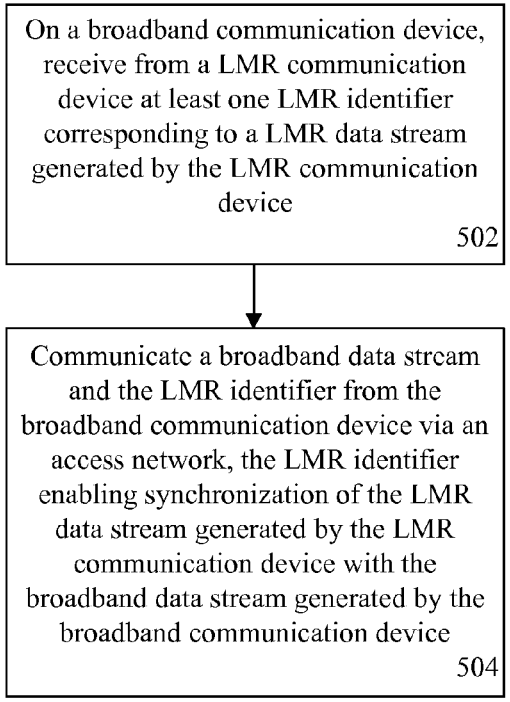
FIG. 5 is a flowchart depicting another data stream synchronization method that is useful for understanding the present invention.

FIG. 5 is a flowchart depicting another data stream synchronization method 500 that is useful for understanding the present invention. Again, the method 500 can begin in a state in which a LMR communication device and a broadband communication device have each established communication links via respective access networks, and a communication link between the LMR communication device and the broadband communication device has been established.

At step 502, on the broadband communication device, at least one LMR identifier can be received from the LMR communication device. The LMR identifier can correspond to a LMR data stream generated by the LMR communication device. At step 504, the broadband communication device can communicate a broadband data stream and the LMR identifier via a respective access network. The LMR identifier can enable synchronization of a LMR data stream generated by the LMR communication device with the broadband data stream generated by the broadband communication device. As noted, the LMR identifier can comprise at least one identifier of an element of a LMR data stream or an identifier that identifies a suitable offset within the LMR data stream.

Figure 6:
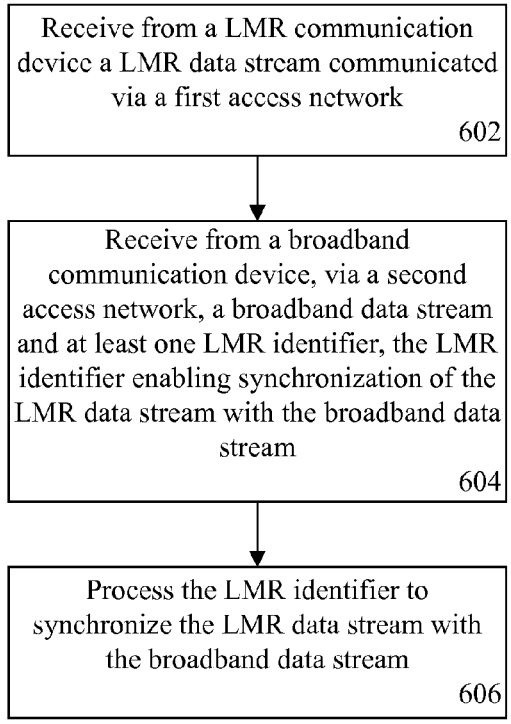
FIG. 6 is a flowchart depicting yet another data stream synchronization method that is useful for understanding the present invention.

FIG. 6 is a flowchart depicting yet another data stream synchronization method 600 that is useful for understanding the present invention. The method 600 can begin in a state in which a media processing system is configured to receive and process a LMR data stream and a broadband data stream. Such data streams can be received from the respective LMR and broadband communication devices, from one or more other devices with which the LMR and broadband communication devices are communicatively linked, from one or more data storage devices on which the LMR data stream and/or the broadband data stream are stored, etc.

At step 602, the media processing system can receive, via a first access network, the LMR data stream generated by the LMR communication device. At step 604, the media processing system can receive, via a second access network, a broadband data stream and at least one LMR identifier. As noted, the LMR identifier can enable synchronization of the LMR data stream with the broadband data stream. The LMR identifier can be embedded within the broadband data stream, or otherwise associated with the broadband data stream in a suitable manner. At step 606, the media processing system can process the LMR identifier to synchronize the LMR data stream with the broadband data stream.

The following use case is provided to exemplify the present invention. In this example, assume that a police officer's vehicle is equipped with a windshield-mounted video camera, which is in turn connected to a broadband communication device. Upon arrival at the scene of a car accident, the police officer may command the broadband communication device to begin transmitting video frames of the scene to a server at the police headquarters via a broadband data stream. The police officer also may provide an oral narrative of the scene via his or her LMR communication device. As the LMR communication device is generating the LMR data stream of voice frames, it may periodically push appropriate LMR identifiers to the broadband communication device.

Upon receipt of the LMR identifiers, the broadband communication device can associate the LMR identifiers with appropriate video data elements, and insert the LMR identifiers into the transmitted broadband data stream. At the police headquarters, a dispatcher can monitor the events of the scene on a console communicatively linked to the server. A suitable synchronization application accessed through the console can receive both the LMR data stream, which comprises audio data, and the broadband data stream, which comprises video frames.

If the broadband data stream is lagging the LMR data stream, upon receiving a video frame from the broadband data stream with an inserted LMR identifier, the synchronization application can search the corresponding LMR data stream for the voice frame referenced by the LMR identifier. Upon locating the referenced voice frame, the synchronization application can establish an association between the present video frame and the retrieved voice frame. Once an association is established, the synchronization application can delay reproduction of the associated voice frame in order to align the voice frame with reproduction of the associated video frame. The synchronization application then can apply this same calculated delay to future voice frames until such time as another LMR identifier is received in the broadband data stream, at which point the LMR data stream and the broadband data stream may be realigned, if necessary.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of synchronizing data streams, comprising:
   on a broadband communication device, receiving from a land mobile radio (LMR) communication device at least one LMR identifier corresponding to a LMR data stream generated by the LMR communication device;
   on the broadband communication device, receiving, from other than the LMR communication device, broadband data;
   associating the at least one LMR identifier with a broadband data element of a broadband data stream that comprises the broadband data and the at least one LMR identifier; and
   communicating, from the broadband communication device to an access network, the broadband data stream, wherein the at least one LMR identifier identifies the LMR data stream generated by the LMR communication device and enables a synchronization of the LMR data stream generated by the LMR communication device and associated with the LMR identifier with the broadband data stream communicated by the broadband communication device.

2. The method of claim 1, wherein communicating the broadband data stream and the at least one LMR identifier from the broadband communication device comprises communicating the at least one LMR identifier in the broadband data stream.

3. The method of claim 1, wherein receiving the at least one LMR identifier from the LMR communication device comprises receiving from the LMR communication device at least one identifier of an element of the LMR data stream.

4. The method of claim 1, wherein the at least one LMR identifier comprises one or more of a Project 25 (P25) encryption synchronization field, a P25 voice frame, and a P25 voice frame index.

5. The method of claim 1, wherein communicating the broadband data stream and the at least one LMR identifier as part of the broadband data stream comprises conveying the LMR identifier in a header associated with the broadband data element.

6. The method of claim 1, further comprising:
   receiving, from the LMR communication device, the LMR data stream;
   receiving, from the broadband communication device, the broadband data stream and the at least one LMR identifier;
   synchronizing the LMR data stream with the broadband data stream based on the at least one LMR identifier.

7. The method of claim 6, wherein synchronizing comprises:
   identifying the data in the LMR data stream that is associated with the at least one LMR identifier; and
   associating data of the broadband data stream that is associated with the at least one LMR identifier with the identified data in the LMR data stream.

8. The method of claim 6, wherein receiving, from the broadband communication device, the broadband data stream and at least one LMR identifier comprises receiving the at least one LMR identifier within the broadband data stream.

9. A method of synchronizing data streams, comprising:
   from a land mobile radio (LMR) communication device, communicating a LMR data stream to an access network; and
   from the LMR communication device, communicating to a broadband communication device and separate from the communication of the LMR data stream to the access network, at least one LMR identifier corresponding to the LMR data stream, wherein the at least one LMR identifier identifies the LMR data stream generated by the LMR communication device and enables a synchronization of the LMR data stream with a broadband data stream generated by the broadband communication device and wherein the at least one LMR identifier is associated with a broadband data element of the broadband data stream.

10. The method of claim 9, wherein communicating the at least one LMR identifier to the broadband communication device comprises communicating to the broadband communication device at least one identifier of an element of the LMR data stream.

11. The method of claim 9, wherein the at least one LMR identifier comprises one or more of a Project 25 (P25) encryption synchronization field, a P25 voice frame, and a P25 voice frame index.

12. The method of claim 9, further comprising:
   receiving, from the LMR communication device, the LMR data stream;
   receiving, from the broadband communication device, the broadband data stream and the at least one LMR identifier;
   synchronizing the LMR data stream with the broadband data stream based on the at least one LMR identifier.

13. The method of claim 12, wherein synchronizing comprises:
   identifying the data in the LMR data stream that is associated with the at least one LMR identifier; and
   associating data of the broadband data stream that is associated with the at least one LMR identifier with the identified data in the LMR data stream.

14. The method of claim 12, wherein receiving, from the broadband communication device, the broadband data stream and at least one LMR identifier comprises receiving the at least one LMR identifier within the broadband data stream.

15. A broadband communication device comprising:
a transceiver;
a wireless communication adapter configured to receive, from a land mobile radio (LMR) communication device, at least one LMR identifier corresponding to a LMR data stream generated by the LMR communication device; and
a controller configured to receive, from other than the LMR communication device, broadband data, and further configured to associate the at least one LMR identifier with a broadband data element of a broadband data stream that comprises the broadband data and the at least one LMR identifier and communicate, via the transceiver, the broadband data stream that comprises the broadband data and the at least one LMR identifier as part of the broadband data stream, wherein the at least one LMR identifier identifies the LMR data stream generated by the LMR communication device and enables a synchronization of the LMR data stream generated by the LMR communication device and associated with the LMR identifier with the broadband data stream communicated by the broadband communication device.

16. An apparatus comprising:
a land mobile radio (LMR) communication device having:
a transceiver;
a wireless communication adapter; and
a controller configured to communicate a LMR data stream to an access network via the transceiver and to communicate to a broadband communication device, via the wireless adapter and separate from the communication of the LMR data stream to the access network, at least one LMR identifier corresponding to the LMR data stream, wherein the at least one LMR identifier identifies the LMR data stream generated by the LMR communication device and enables a synchronization of the LMR data stream with a broadband data stream generated by the broadband communication device and wherein the at least one LMR identifier is associated with a broadband data element of the broadband data stream.

17. The apparatus of claim 16, further comprising the broadband communication device and wherein the broadband communication device is configured to:
receive, from the LMR communication device, the at least one LMR identifier;
receive, from other than the LMR communication device, broadband data; and
wirelessly communicate the broadband data stream, wherein the broadband data stream comprises the broadband data and the at least one LMR identifier as part of the broadband data stream.

\* \* \* \* \*